United States Patent [19]

Hiruta

[11] Patent Number: 5,351,485
[45] Date of Patent: Oct. 4, 1994

[54] ROTARY ACTUATOR-OPERATED PRETENSIONER

[75] Inventor: Mitsuhiko Hiruta, Shiga, Japan

[73] Assignee: Takata Corporation, Tokyo, Japan

[21] Appl. No.: 66,528

[22] Filed: May 24, 1993

[30] Foreign Application Priority Data

May 27, 1992 [JP] Japan .................. 4-158955

[51] Int. Cl.⁵ .......................................... F16D 31/00
[52] U.S. Cl. ........................ 60/325; 60/407; 280/806; 297/478
[58] Field of Search ............... 60/325, 370, 371, 407, 60/408; 280/806, 807; 297/478, 480

[56] References Cited

U.S. PATENT DOCUMENTS

| | | | |
|---|---|---|---|
| 4,919,450 | 4/1990 | Doty et al. | 280/806 X |
| 4,976,474 | 12/1990 | Doty et al. | 280/807 X |
| 4,991,874 | 2/1991 | Tsuge et al. | 280/806 |
| 5,087,075 | 2/1992 | Hamaue | 280/807 X |

FOREIGN PATENT DOCUMENTS

| | | |
|---|---|---|
| 0299854 | 1/1989 | European Pat. Off. |
| 4223469 | 1/1993 | Fed. Rep. of Germany ...... 280/806 |
| WO87/03849 | 7/1987 | PCT Int'l Appl. |
| 951813 | 3/1964 | United Kingdom. |
| 1136125 | 12/1968 | United Kingdom. |
| 1571011 | 7/1980 | United Kingdom. |

Primary Examiner—Edward K. Look
Assistant Examiner—Hoang Nguyen
Attorney, Agent, or Firm—Brumbaugh, Graves, Donohue & Raymond

[57] ABSTRACT

A rotary actuator-operated pretensioner comprises a gas generator and a rotary actuator that is driven in rotation by pressurized gas supplied by the gas generator and drives a belt take-up reel. Annular flange portions extend from the cylinder side walls into the operating chamber, the flange portions being coaxial with the axis of rotation of the rotor, and the rotor is supported by the cylinder for rotation by reception of the flange portions within end portions of the rotor body. An elastomer seal member is mounted on the side of the rotor vane portion that faces the pressure section of the operating chamber. The seal member has lip portions along its edges that are urged by gas pressure in the pressure section against the side walls and peripheral wall of the cylinder.

2 Claims, 4 Drawing Sheets

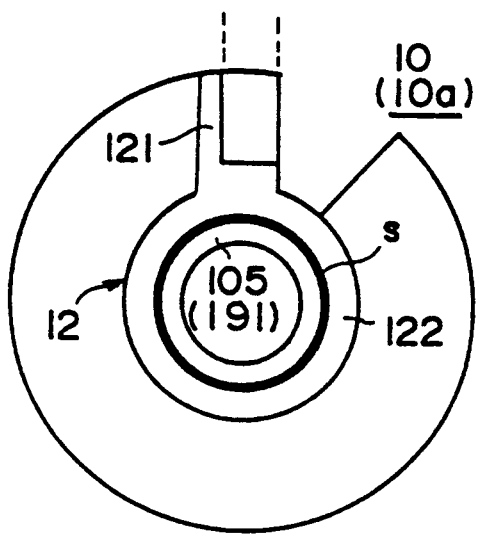
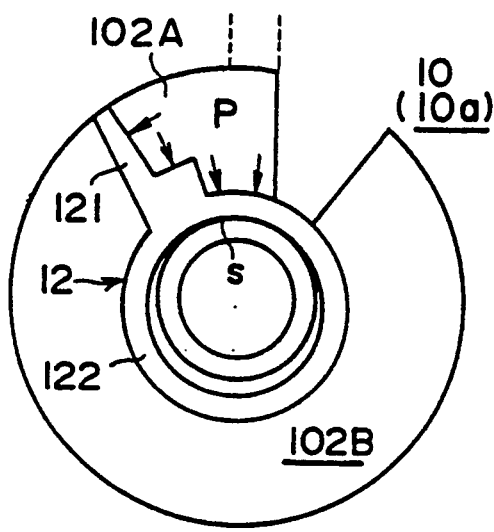
FIG. 5A          FIG. 5B
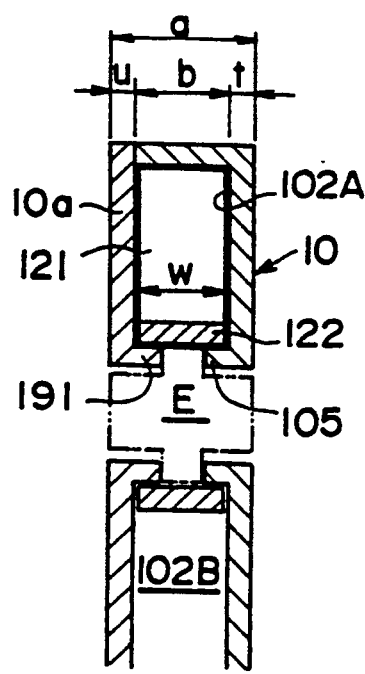
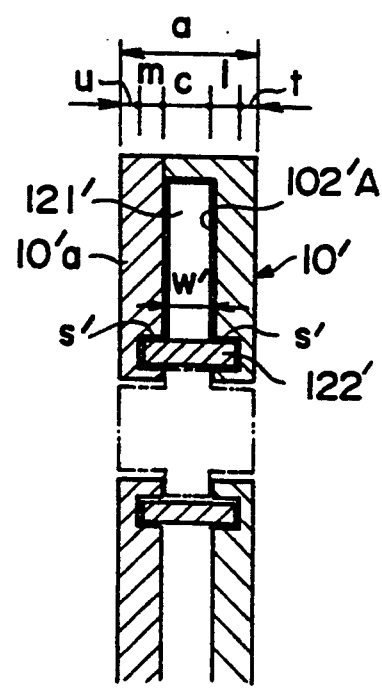
FIG. 6A          FIG. 6B

ROTARY ACTUATOR-OPERATED PRETENSIONER

BACKGROUND OF THE INVENTION

The present invention relates to a pretensioner for a seat belt system and, in particular, to a pretensioner in which a belt take-up reel is driven in rotation to wind a segment of the seat belt onto it by a rotary actuator operated by gas pressure supplied by a gas generator.

Seat belt pretensioners are often provided in vehicle seat belt systems to tighten the seat belt at the instant of a collision or other emergency and thereby more firmly restrain the seat occupant against being thrown forward. One known type of seat belt pretensioner employs a rotary actuator that is supplied with gas under pressure from a gas generator and is coupled to a belt take-up reel. The gas from the generator is supplied to an annular cylinder chamber of the actuator and drives the rotor in rotation, thereby rotating the take-up shaft. A pretensioner of the type operated by a rotary actuator is disclosed in Japanese Patent Publication No. 60-15657.

In previously known pretensioners that are based on rotary actuators as the driving mechanism, leakage of the pressurized gas from the pressure section of the cylinder at various places results in a loss of the available energy of the gas. Minimizing the leakage of gas has heretofore been accomplished by maintaining close dimensional tolerances in the manufacture of the components of the actuator. Even with the maintenance of close dimensional tolerances, which increases manufacturing costs, leakage of the gas is still a problem.

In previously known rotary actuator-operated pretensioners, moreover, the rotor is mounted on the cylinder by reception of end portions of the ring body in holes in the cylinder. In that arrangement, the width of the rotor vane is reduced compared to the width in the direction of the axis of rotation of the rotor by an amount equal to the total of the widths of the portions of the rotor body that extend out into the receiving holes of the cylinder. In order to maintain a given force on the vane, it is necessary, therefore, for the actuator to have a width somewhat greater than the sum of the width of the vane plus the widths of the portions of the rotor ring body that are received in the holes in to cylinder side walls.

SUMMARY OF THE INVENTION

One object of the present invention is to provide a pretensioner of the type that uses a rotary actuator in which a rotor vane of a desired area is accommodated in a cylinder of a reduced width in the direction of the axis of rotation of the rotor. Another object is to provide a rotary actuator-operated pretensioner that more effectively uses the available energy of the gas produced by the gas generator by reducing the losses of gas through leakage, which is significant in previously known rotary actuator-operated pretensioners, without requiring close dimensional tolerances to be established and maintained.

The foregoing objects are attained, in accordance with the present invention, by a rotary actuator-operated pretensioner having a gas generator and a rotary actuator that is driven in rotation by pressurized gas supplied by the gas generator. The rotary actuator has a cylinder that defines an annular operating chamber having side walls, a peripheral wall and a partition wall extending from the peripheral across the operating chamber. The operating chamber receives a rotor having an annular body portion and a vane portion extending across the operating chamber from the body portion and defining, together with the partition wall, a pressure section on one side of the vane portion into which gas from the generator is delivered and an exhaust section on the other side of the vane portion. The cylinder has an exhaust opening to the atmosphere from the exhaust section.

The invention is characterized in that annular flange portions extend from the cylinder side walls into the operating chamber, the flange portions being coaxial with the axis of rotation of the rotor, and in that the rotor is supported by the cylinder for rotation by reception of the flange portions within end portions of the rotor body.

In a preferred embodiment, the invention is further characterized in that an elastomer seal member is mounted on the side of the rotor vane portion that faces the pressure section of the operating chamber and in that the seal member has lip portions along its edges that are urged by gas pressure in the pressure section against the side walls and peripheral wall of the cylinder.

By mounting the rotor on flange portions that extend from the side walls of the cylinder into the operating chamber, the width of the rotor vane can be made equal to the width of the annular rotor body, thereby increasing the area of the rotor vane for any given width of the actuator in the direction or the axis of rotation of the rotor. Conversely, the width of the cylinder for any given area of the rotor vane can be reduced, as compared with previously known actuators.

In addition, the mounting of the annular rotor body on annular flange portions of the cylinder that extend into the operating chamber from the side walls of the cylinder reduces leakage of the gas. In this regard, the gas pressure acting on the rotor pushes the rotor against the flanges and minimizes the size of any gap between the rotor and the portions of the cylinder, i.e., the flanges portions, on which the rotor is mounted adjacent the pressure section. The elimination of the gap reduces leakage of gas from the pressure section. In the mounting arrangement of previously known actuators, the displacement of the rotor transversely of the axis of rotation of the rotor due to gas pressure acting on the rotor results in an increase in the gap between the rotor and the holes or grooves in the cylinder walls that receive the rotor body adjacent the pressure section. Any gas that leaks from the pressure section at a gap between the rotor and the portions of the cylinder that supports it readily reaches and escapes from the exhaust section.

The elastomer seal member on the vane provides additional reductions in leakage from the pressure section of the actuator.

The cumulative effect of better sealing of the gap between the rotor and the portions of the cylinder that support the rotor and between the vane and the cylinder increases the efficiency of the actuator. For any given output, a smaller quantity of gas-generating substance in the gas generator is required, and the gas generator can be smaller. The ability to have a rotor vane of a given size with a cylinder of reduced width also makes a reduction in size and weight possible. The sealing arrangements of the invention, furthermore, reduce the requirements for maintaining close manufacturing tolerances. Accordingly, the invention makes possible a rotary actuator-operated pretensioner that is smaller and less costly to produce, for any given output.

For a better understanding of the invention, reference may be made to the following description of an exemplary embodiment, taken in conjunction with the accompanying drawings.

DESCRIPTION OF THE DRAWINGS

FIGS. 5(A) and 5(B) are schematic illustrations of one aspect of the function of the embodiment; and FIGS. 6(A) and 6(B) are schematic illustrations of another aspect of the function of the embodiment.

DESCRIPTION OF THE EMBODIMENT

Figure 1:
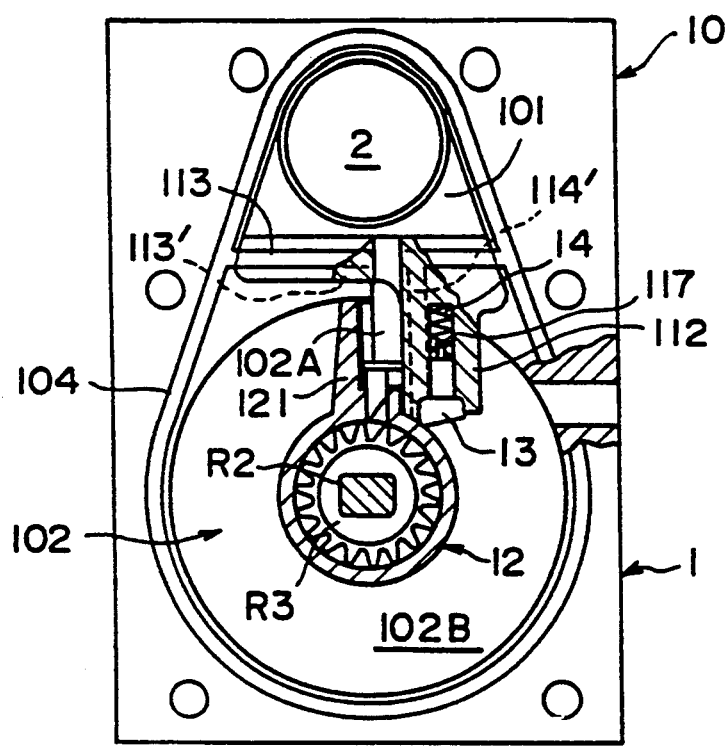
FIG. 1 is a front view of the embodiment with the cover of the cylinder removed, some parts being shown in cross-section.
Figure 2:
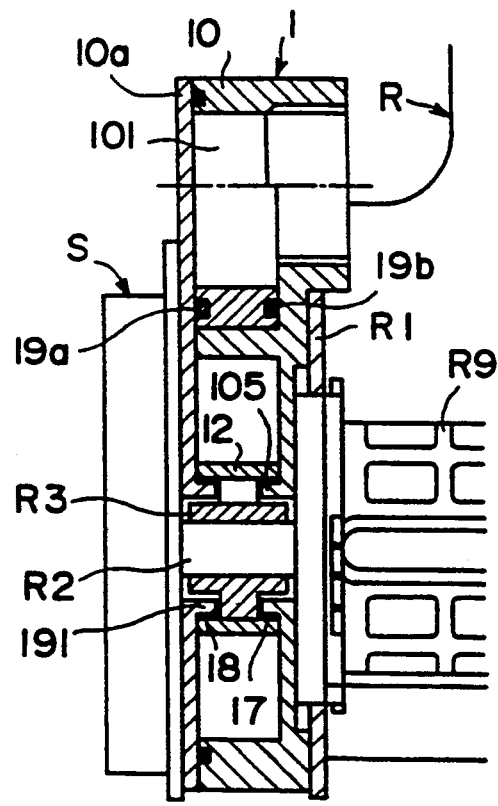
FIG. 2 is a side cross-sectional view of the embodiment.

As shown in FIG. 1 and FIG. 2, the embodiment of a rotary actuator-operated pretensioner comprises as the driving device for a rotatable belt take-up reel R9 a rotary actuator that is operated by a gas supplied from a gas generator 2. The actuator assembly 1 is attached to one side of a frame R1 of a belt retractor R by screws (not shown). A belt-rewinding spring unit S of the retractor R is mounted on the side of the actuator 1 opposite from the frame R1. Between a take-up shaft R2 of the retractor R and the actuator 1 is an engaging mechanism (described in detail below) for connecting the actuator to the take-up shaft R2 only during operation of the actuator 1. A ratchet wheel R3, which serves as an engaged part of the engaging mechanism, is received on a rectangular portion of the take-up shaft R2 and is, therefore, non-rotatable with respect to the take-up shaft R2.

The actuator 1 comprises a gas supply chamber 101 that receives the gas generator 2, a cylinder 10 having an operating chamber 102 that communicates with the supply chamber 101, and a rotor 12 that is rotatably supported in the cylinder within the operating chamber 102. A vane 121 on the rotor 12, in cooperation with a partition wall 112 on the cylinder 10, separates the operating chamber 102 into a pressure section 102A that communicates with the gas generator and a exhaust section 102B that is open to the atmospheric air. The cylinder 10 and the cover 10a have annular flanges 105 and 191, respectively, that are located concentrically to the shaft hole and extend into the operating chamber 102. The rotor ring body 122 is mounted for rotation on the annular flanges 105 and 191 by reception of the flanges within the body 122 or the rotor.

Figure 3:
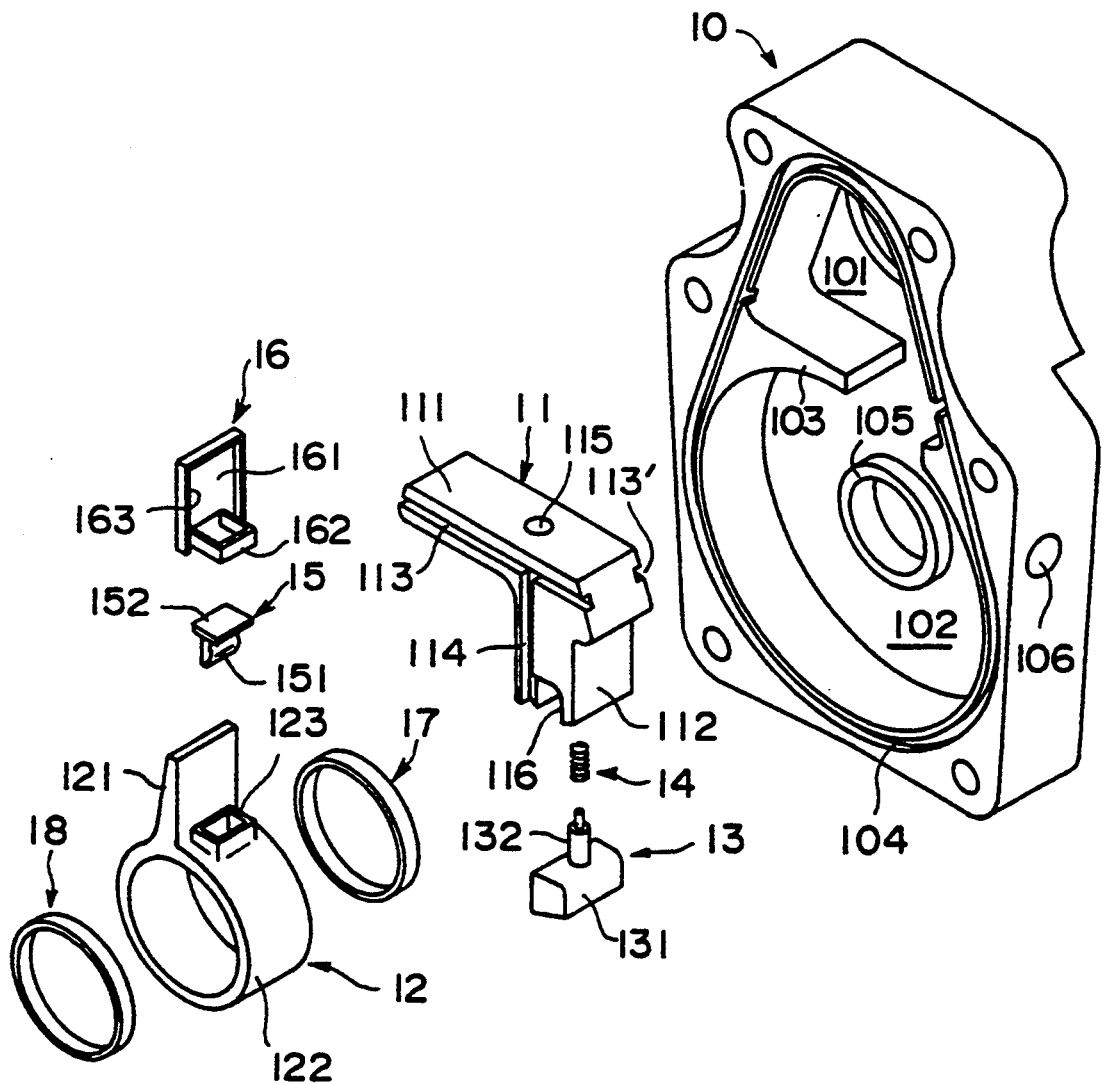
FIG. 3 is an exploded pictorial view of the embodiment.

Referring next to FIG. 3, the operating chamber 102 of the cylinder 10 has one side open and is bounded by a circular cylindrical peripheral wall and a side wall. The supply chamber 101, similarly, has one side open and is defined by a peripheral wall, a side wall and a wall 103, which is located adjacent to the operating section 102. A cover 10a (FIG. 2) closes the open sides of the chambers 101 and 102. The cylinder has holes for the screws that fasten it to a frame of the retractor. The wall 103, which separates the operating chamber 102 from the supply chamber 101, extends only about one-half of the way across the cylinder, leaving a gap that is filled by a partition wall block 11. A sealing groove 104 is formed on the cylinder 10 around the outer periphery of the operating chamber 102 and the supply chamber 101. An annular flange 105 extends from the side wall of the operating chamber 102 into the operating chamber and surrounds the shaft hole that receives the end portion of the reel shaft R2. An exhaust hole 106 leads from the operating chamber 102 to outside the cylinder 10.

The partition wall block 11 comprises a wall portion 111 that is attached to the flat side of the wall 103 of the supply chamber 101 and extends in a direction traverse to the two chambers 101 and 102, and a partition wall 112 that extends across the operating chamber 102 such that its extremity is close to the surface of the rotor body 122. Sealing grooves 113 and 114 that intersect each other are formed on the end surfaces of the wall portion 111 and the partition wall 112 of the block 11. Also, similar sealing grooves 113' and 114' are formed on the rear side of the partition wall block 11. A gas inlet hole 115 passes through the wall portion 111, and a notch 116 that receives a portion of the sealing member is provided at the tip of the partition wall 112. A hole (FIG. 1) 117 extends into the partition from the base of the notch 116. A seal member 13 on the partition wall 122 forms a seal between the partition wall and the rotor 12. The seal member 13 is urged toward the rotor 12 by a resilient loading means, such as a coil spring 14.

The rotor 12 comprises a body portion in the form of a ring 122 defining within it a space surrounding the outer periphery of a ratchet wheel R3 (FIG. 1 and FIG. 2). The inner surface of the ring 122 also supports the rotor 12 in the cylinder for rotation in the operating chamber, as described below. A vane 121 extends radially across the operating chamber 102 and serves as a pressure-receiving portion on which the gas acts. A bullet guide tube 123 in the form of a rectangular tube is formed on the back of the vane 121 to receive a bullet 15, which is also described below.

An elastomer seal member 16 is mounted on the rotor. The seal member 16 has a wall portion 161 that engages the pressure side of the vane 121, a continuous seal lip 163 on both side edges and end edge, and a frame-like portion 162 that fits over the outer portion of the bullet guide tube 123. When the rotor 12 is rotated, the seal lip 163 serves to seal a gap between the cylinder 10 and the rotor 12 by being forced out against both sides (one of the side surfaces is the side surface of the cover 10a) and at the perimeter of the operating chamber 102 by gas pressure. The upper surface of the portion 162 and a part of the attachment 161 elastically contact a pressure-receiving head 152 of the bullet 15 and serve to seal the opening of the bullet guide tube 123 against leakage.

The bullet 15, which serves as an actuator side engaging means of the engaging mechanism, is received in the opening of the guide tube 123 in such a manner that it can be displaced freely in the radial direction. The bullet 15 comprises the pressure-receiving head 152 for receiving gas pressure and a wedge-like tip 151, which serves as an engaging means with the ratchet wheel R3. The tip 152 is directed toward the ratchet wheel R3.

The seal member 13 comprises a wedge-like body 131 and a guide shaft 132 that is received in the spring accommodation hole. A wedge-like tip of the body 131 serves as a sliding seal that engages the outer peripheral surface of the ring body 122 of the rotor 12.

A pair of bearing rings 17 and 18 rotatably support the rotor 12 on the cylinder 10. The respective bearing rings are fitted to a support flange 105 protruding into the operating chamber 102 of the cylinder 10 and to an annular support flange 191 formed on the cover 10a that covers the open end of the cylinder 10, as shown in FIG. 2, and rotatably support the inner surface of the ring body 122 of the rotor 12. Therefore, in the assembled state as shown in FIG. 2, the rotor 12 is supported on the outer peripheral surface of the two support flanges 105 and 191 by the two bearing rings 17 and 18.

Two elastomer seals 19a and 19b (FIG. 2), each in the form of an O-ring, are received, respectively, in each of the sealing grooves 104, 113, 114, 113' and 114' and serve to seal gaps between the cylinder 10 and the cover 10a, between the supply chamber 101 and the operating chamber 102, and between the pressure section 102A and the exhaust section 102B.

Figure 4D:
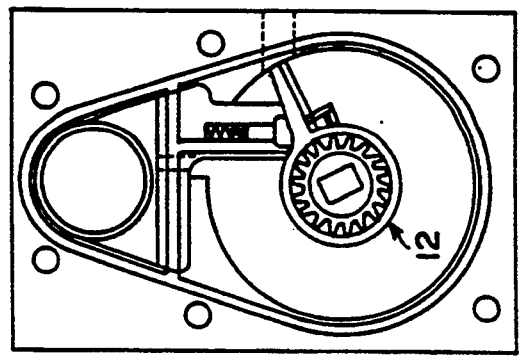
FIGS. 4(A) to 4(D) are front views showing the embodiment at different stages of operation.

Next, the operation of the above embodiment will be described. FIG. 4(A) shows the configuration of a pretensioner with the above arrangement in the non-operating position. The rotor 12 is positioned with the bullet guide tube 123 abutting the partition wall 112. Under this condition, the pressure section 102A is at the most compressed state, and the bullet 15 is positioned by suitable means, such as a shear pin, so that it is not engaged with the engagement tooth R31 on the outer periphery of the ratchet wheel R3. Therefore, the take-up shaft R2 is completely separated from the actuator 1, and the retractor may function in its normal manner.

When the gas generator is operated by suitable means, such as an electric signal, gas under pressure is introduced into the pressure section 102A through the supply chamber 101 and the gas inlet hole 115. The force due to the gas pressure acting on the pressure-receiving head 152 of the bullet 15 pushes the bullet inwardly toward the ratchet wheel R3 in the radial direction to the position shown in FIG. 4(B). At this moment, the bullet tip 151 engages a tooth R31 of the ratchet wheel R3, and the rotor 12 is thus engaged with the ratchet wheel R3 by the bullet 15. Accordingly, the take-up shaft R2 is now connected to the actuator 1.

Figure 4C:
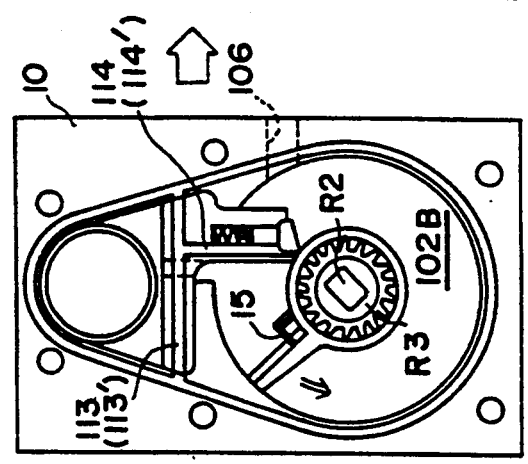
Figure 4B:
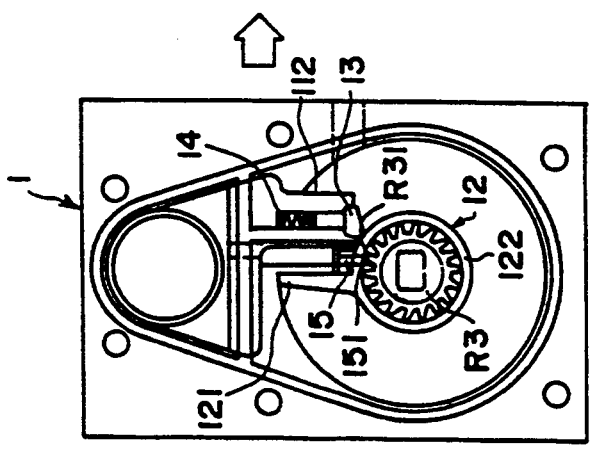
Figure 4A:
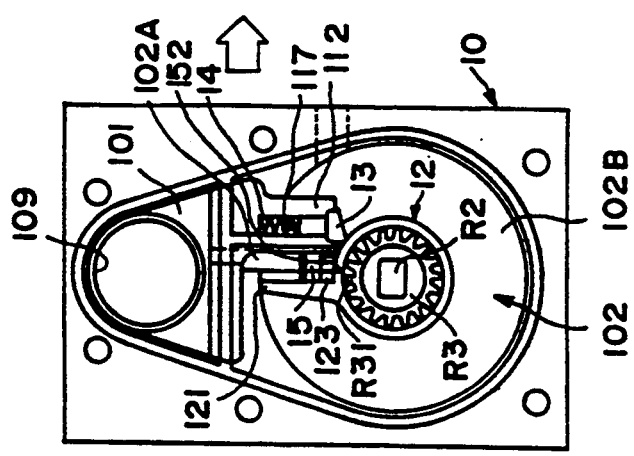

Gas pressure also acts on the vane 121 of the rotor 12, and the force due to the gas pressure acting on the vane causes the rotor 12 to be rotated counterclockwise, as shown by the arrow in FIG. 4(C). Upon rotation of the rotor, pressure is generated in the exhaust section 102B and is released to atmospheric air through the exhaust hole 106 of the cylinder 10, and the generation of resistance to rotation of the rotor due to a pressure increase in the exhaust section 102B is prevented. Thus, the rotating force of the rotor 12 is transmitted to the take-up shaft R2 through the bullet 15 and the ratchet wheel R3.

Upon the rotation of the take-up shaft R2, a segment of the belt is wound onto the take-up shaft R2, and pretension is imparted by tightening of the belt. Finally, the rotor 12 reaches the position shown in FIG. 4(D), and the operation of the pretensioner is completed.

During the operation of the pretensioner, the seal member 13 receives the spring load of the coil spring 14 and is continuously urged against the outer peripheral surface of the ring body 122 of the rotor 12. The seal prevents the gas in the pressure section 102A of the chamber 102 from leaking from the pressure section 102A to the exhaust section 102B through the gap between the tip of the partition wall 112 and the ring unit 122.

Gas leakage through the gaps between both side surfaces of the partition wall 112 and the end wall of the cylinder as well as the cover 10a is blocked by a pair of elastomer seals 19a and 19b engaged in the sealing grooves 114 and 114'. Gas leakage between the vane 121 and the cylinder 10 is blocked by the seal lip 163 of the elastomer seal member 16. Further, leakage from the opening of the bullet guide tube 123 to engagement space is prevented by the portion 162 of the elastomer seal member 16.

Referring to FIG. 6(A), when the actuator is not operated, there is a small gap "s" due to the manufacturing tolerance between the inner surface of the rotor body 122 and each of the annular flanges 105 and 191 by which the rotor is supported. In the drawing, the gap is shown with some exaggeration, and the bearing rings are not shown. When the actuator is operated, as shown in FIG. 6(B), the pressure of the gas introduced into the pressure section 102A of the operating chamber acts on the rotor and produces a force that displaces the rotor toward the annular flanges 105 and 191. The displacement diminishes the gap "s" along the portion of the rotor ring body 122 adjacent the pressure section 102A. The reduction of the gap "s" enhances the sealing effect of the engagement of the rotor ring body 122 with the flanges 105 and 191.

The enhancement of the sealing of the engaging surfaces of the rotor body 122 and the flanges 105 and 191 is a characteristic of the way in which the rotor is supported in the cylinder according to the present invention, and it not found in the prior art mounting arrangements. As shown with some exaggeration in FIG. 6(A), the displacement of the rotor toward the flanges 105 and 191 and the resulting reduction if the gap "s" enhances the seal in the region of engagement, which is adjacent the pressure section 102A. By comparison, as shown in FIG. 6(B), the previously known mounting arrangement, in which the rotor ring body 122' is received in annular grooves in the cylinder, results is a displacement of the rotor due to the gas pressure in the pressure section 102A' that increases the sizes of the gaps "s'" between the radially inwardly facing surfaces of the grooves in the cylinder walls and the radially outward surfaces of the rotor ring body 122' received in the grooves. The gaps "s'" permit gas to leak from the pressure chamber, which is at a high pressure, and flow circumferentially along the gaps into the exhaust section, which is at a low pressure. Accordingly, the mounting arrangement shown in FIG. 6(B) does not provide an effective seal between the rotor body and the cylinder.

Another benefit of the mounting arrangement of the invention, which is also illustrated in FIGS. 6(A) and 6(B), is an increase in the size of the rotor vane 121 for a given width of the cylinder 10 in the direction of the axis of the rotor. In the invention, FIG. 6(A), if the width of the cylinder 10 and the cover 10a is "a" and the walls have thicknesses of "t" and "u", the vane may have a width "w" equal to "b." In the prior art arrangement, FIG. 6(B), the width "w'" of the vane must be reduced to "c" by the total of the depths "l" and "m" of the grooves in the cylinder and cover that receive the rotor ring body 122'.

Thus, there is provided, in accordance with the present invention, a rotary actuator-operated pretensioner in which gas leakage from the pressure section 102A into the exhaust section 102B, as well as into the space E, FIG. 6(A), in which the shaft engagement structure is located, is effectively prevented. Accordingly, the efficiency of the actuator is improved. Moreover, the width "w" of the vane can be increased for any given width of the cylinder.

The above-described embodiment of the invention is exemplary, and numerous variations and modifications of the embodiment can be made by those skilled in the art without departing from the spirit and scope of the invention. All such variations and modifications are intended to be included within the scope of the invention, as set forth in the claims appended hereto.

I claim:

1. A rotary actuator-operated pretensioner comprising a gas generator and a rotary actuator that is driven in rotation by pressurized gas supplied by the gas generator, the rotary actuator including a cylinder having an annular operating chamber having side walls, a peripheral wall and a partition wall extending across the operating chamber, and the rotary actuator including a rotor having an annular body portion rotatably received in the operating chamber and a vane portion extending across the chamber from the body portion and defining with the partition wall a pressure section on one side of the vane portion into which gas from the generator is delivered and an exhaust section on the other side of the vane portion, the cylinder having an exhaust opening to the atmosphere from the exhaust section, the annular flange portions extending from the cylinder side walls into the operating chamber, the flange portions being coaxial with the axis of rotation of the rotor, and the rotor being supported by the cylinder for rotation by reception of the flange portions within end portions of the rotor body portion, the rotor body portion overlapping surfaces of the flange portions that face away from the axis of rotation of the rotor.

2. A rotary actuator-operated pretensioner according to claim 1 and further comprising an elastomer seal member mounted on the side of the rotor vane portion that faces the pressure section of the operating chamber, the seal member having lip portions along its edges that are urged by gas pressure in the pressure section against the side walls and peripheral wall of the cylinder.

* * * * *